Jan. 27, 1970  G. MAESTRELLI  3,491,887
SOLVENT FILTER PARTICULARLY DESIGNED FOR DRY-CLEANING PLANTS
Filed Dec. 14, 1967  2 Sheets-Sheet 1

GINO MAESTRELLI,
INVENTOR.

BY *Wendworth, Lind & Ponack,*
Attorneys

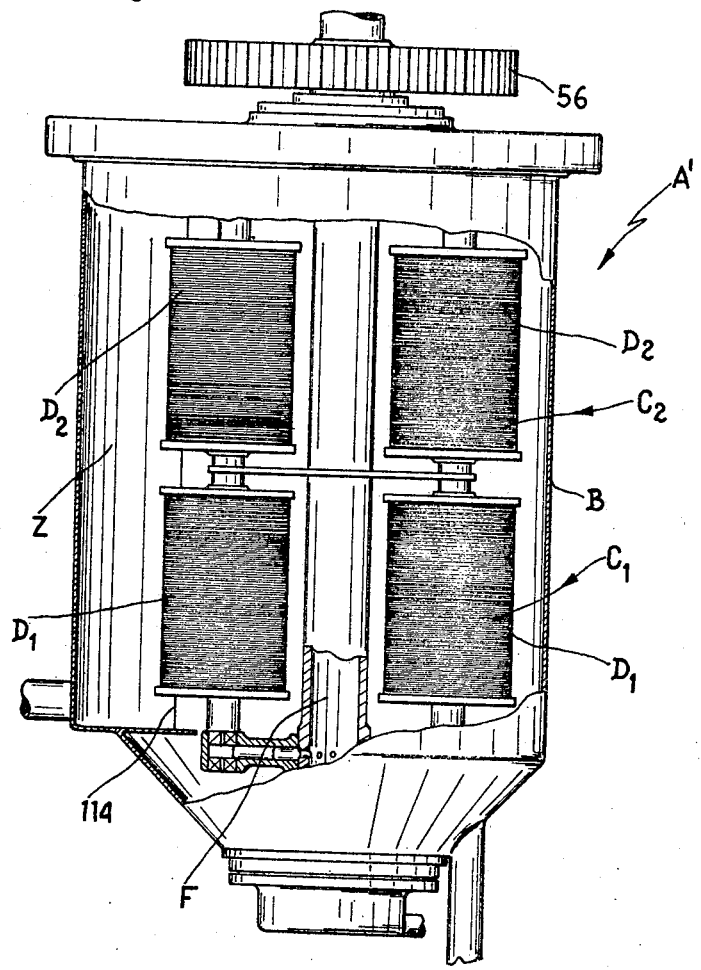

United States Patent Office 3,491,887
Patented Jan. 27, 1970

3,491,887
SOLVENT FILTER PARTICULARLY DESIGNED FOR DRY-CLEANING PLANTS
Gino Maestrelli, 55 Via Bernardo Quaranta, Milan, Italy
Filed Dec. 14, 1967, Ser. No. 690,626
Claims priority, application Italy, Oct. 13, 1967, 21,559/67
Int. Cl. B01d 35/16
U.S. Cl. 210—330          4 Claims

ABSTRACT OF THE DISCLOSURE

An automatically cleaned solvent filter, particularly designed for dry-cleaning plants, comprising a filtering unit formed by a plurality of filtering elements halo-arranged around a rotatable shaft. Said filtering unit is fitted into a chamber having a suitable volute-shaped cross section, adapted to impart a centrifugal-centripetal motion, relative to said shaft, to the liquid solvent during the rotation of said filtering unit, whereby the filtering surfaces of said filtering elements are cleansed of the exhausted powder and dirt collected thereon.

CROSS-REFERENCE

Reference should be made to the copending patent application Ser. No. 644,560, now U.S. Patent No. 3,438,-497, filed June 8, 1967, in the name of same applicant.

BACKGROUND

This invention concerns an automatically cleaned solvent filter, particularly designed for dry-cleaning plants.

A system for the automatic cleaning of a solvent filter, particularly suitable for application in dry-cleaning plants, has been disclosed and claimed in the copending patent application Ser. No. 644,560 filed June 8, 1967, in the name of applicant. The invention idea whereon such system is essentially based consists in having the filter elements, contained in the filtering chamber, periodically moved within the solvent volume, in order to impart a turbulent motion thereto, which results in a sort of pumping effect being exerted on the solvent, whereby the filter element surfaces are periodically flushed, thus removing the exhausted filtering powder and the dirt collected thereon; such motion is imparted to the filter elements at the end of the filtering step for the solvent, i.e. when all dirt and foreign matters have been removed therefrom.

Some forms of automatically cleaned filters, embodying said system, are described and claimed in the above described patent application, and substantially all which is stated therein as to the design of each filtering unit, holds also in the present patent application, in the part concerning the structure and the operation of the filtering unit during the solvent filtering step.

SUMMARY

The solvent filter object of the invention may be regarded as a simplification of those disclosed in the previously stated patent application, and a variant as regards the solvent pumping action in the cleansing step. The filter according to the present invention comprises: at least one filtering unit, consisting of a plurality of filter elements secured to a shaft; a suitably shaped chamber, wherein said filter unit is fitted, and to which the inlet and outlet ducts for the solvent are connected; and means by which said shaft and thus said filter unit are periodically moved, in order to impart a centrifugal and centripetal motion to the solvent in respect to said shaft, whereby to obtain a cleansing of the filtering surfaces of said elements, which are forcibly flushed by the thus moved solvent and consequently thoroughly cleared of the exhausted filtering powder and dirt collected thereon.

The motion imparted to the shaft, and thus to the filtering unit, is advantageouly a rotary motion around the axis of the shaft, whereby the filtering elements of the unit will act like the impeller blades of a centrifugal pump, to which the filtering unit may be assimilated, and that is self-fed with the same liquid present in the filter chamber.

In order to enhance the centrifugal-centripetal effect of the liquid, thus improving the cleansing action exerted on the filtering elements, the filter chamber is provided with baffle and guide means for the whirling liquid mass, which is to be continuously brought, while the filtering unit is being rotated, from the outer wall of said chamber, back to center thereof, in order to obtain the required centrifugal-centripetal motion.

The baffle and guide means advantageously consist of at least one suitably shaped axial duct, peripherally formed in the wall of the filter chamber, having a preferably scroll-shaped cross-section.

The above and further objects of this invention will be better appreciated from a consideration of the following description, taken with the accompanying drawings, which are given only as a non-restrictive example of the scope of the invention.

DRAWINGS

FIG. 3 is a partially sectioned view of a further embodiment form of the filter according to the invention.

DETAILED DESCRIPTION

Figure 1:
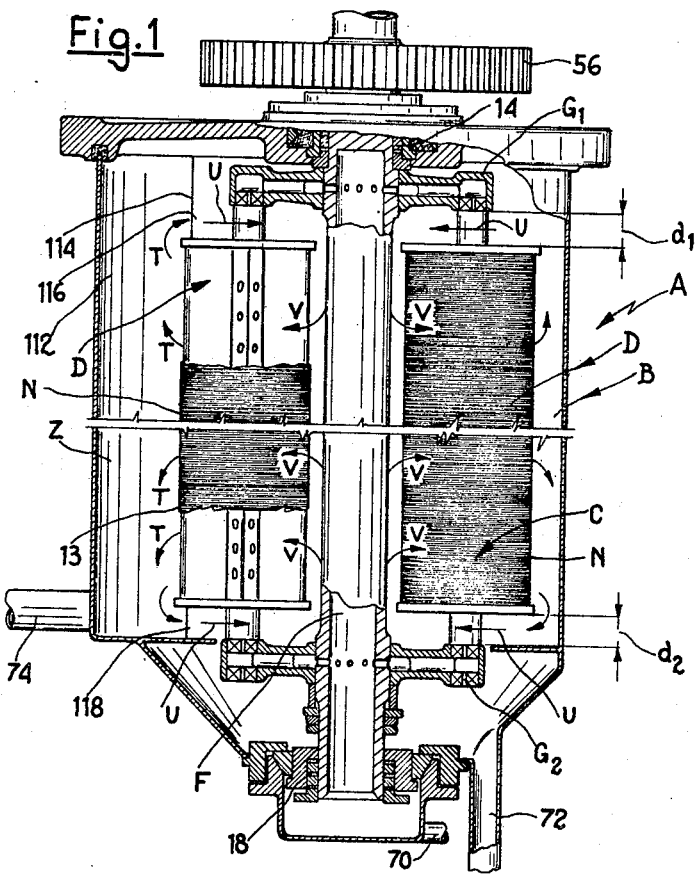
FIG. 1 is a partially sectioned side view of a first embodiment form of the automatically cleaned filter according to the invention.
Figure 2:
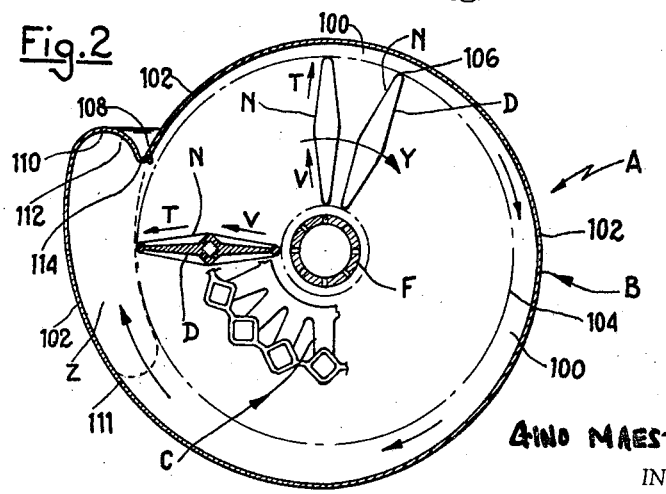
FIG. 2 is a cross-section of the filter of FIG. 1.

Referring now to the drawings, and firstly to FIGURES 1 and 2, A is the automatically cleansed solvent filter, designed particularly for application in a dry-cleaning installation for linen, garments or the like. Such filter consists of a chamber or box B, wherein the filtering unit C is fitted, said filtering unit being substantially similar to that disclosed in U.S. patent application Ser. No. 644,560 filed June 8, 1967, in the name of applicant. Said chamber B is connected with the installation by the dirty solvent inlet duct 74, and by the filtered solvent outlet duct 70, through which same filtered solvent is recycled, while 72 is a drain duct for the mud collected in the lower section of chamber B (all reference letters utilized in this specification are similar to those used in the specification of the above-stated application).

The unit C consists of a central, hollow shaft F, rotatably laid in the tight sealing upper bearing 14, and lower bearing 18. Keyed on the outside protruding end of said shaft is a driven gear 56, in mesh with a suitable driving gear whereby to impart the required motion to shaft F.

Secured to top end of the shaft F is a circular plate G1, while another similar plate G2 is likewise fastened to the bottom end of the same shaft, said plates being perpendicular to the axis of the shaft F and adapted to firmly retain the filtering elements D, which extend axially and have a lozege shaped cross-section as stated in above-stated copending patent application. Each filtering element D is outwardly delimited by the wire 13, that is wound on the frame of the element, in such a manner as to form a surface having an unusually high filtering efficiency, and obviously the whole unit C will show a very large filtering surface, resulting from the sum of the single filtering surfaces.

The hydraulic connections between the chamber B, the filtering elements D and the hollow shaft F are similar to those disclosed and shown in the above-stated copending patent application.

As shown more clearly in FIG. 2, the chamber B has a suitable volute shaped cross-section, since the interspace 100 between the wall 102 of chamber B and the imaginary circle 104 wherein the outer corners 106 of different filtering elements D are displaced is gradually increasing, beginning from the point 108 and extending to the point 110.

The wall 102 is bound in the zone 110, adjacent to the point 108, by an axially directed tile-shaped piece 112, that is in turn delimited by the axial corner 114, wherefrom the wall 102 starts again.

Thus, a sort of axial duct Z is formed between the points 111 and 108 of the wall 102, said duct being freely open across its whole height toward the chamber B, while its upper end 116 leads above the filtering elements D, and its bottom end 118 is connected below said filtering elements.

The distance $d1$ and $d2$ respectively between ends of the filtering elements and the related plates G1 and G2 by which the mechanical and hydraulic connections thereof with the shaft F are ensured, are relatively great, to allow for the centrifugal-centripetal motion of the solvent as stated in more detail hereinafter.

The operation and performances of the automatically cleansed solvent filter A can be summarized as follows:

After a given number of filtering steps, in the course of which the filtering unit C has been kept stationary within the chamber B, a given amount of exhausted filtering powder and dirt will have been collected onto the filtering surfaces N of the different elements D which form part of the unit C, whereby the necessity arises to have same clogging mass removed therefrom, to restore the filtering efficiency of said surfaces.

For such a purpose, a rotary motion is imparted to unit C by the transmission (not shown) acting on the gear 56, whereby the shaft F is turned, in the direction e.g. of arrow Y, and thus the whole unit C is rotated at a given angular speed.

The filtering unit C thereby acts like a centrifugal pump impeller, the impeller blades being represented by the radially directed filtering elements D, as shown in FIG. 2.

Thus, a peculiar motion is imparted to the whole mass of solvent contained in the chamber B by said rotary motion of the unit C.

In fact, said liquid mass is initially caused to rotate by the blades D, without any appreciable relative motion between the impeller (i.e. the unit C) and said liquid. However, when the tile-shaped baffle plate 112 is encountered by the liquid, the flow of liquid motion is sharply modified, i.e. the rotation of the impeller is not more followed by it.

A centrifugal-centripetal motion is thus imparted to the liquid, i.e. it is forced centrifugally in the direction of arrows T against the wall 102, by the blades D, whereby it flows outwardly of the rotary unit C, due to said centrifugal action, whereafter said liquid is conveyed by the duct Z toward the axis of rotary unit, i.e. in a centripetal direction; then it flows again in the direction of arrows V toward the wall 102, and so on.

Thus, while the unit C is being turned, a centrifugal-centripetal motion is imparted to the liquid (i.e. said liquid is forced outwardly by the blades, and then is conveyed inwardly by the duct Z), whereby the filter operates like a self-feeding centrifugal pump.

During such time, the filtering surfaces N are forcibly flushed by the whirling liquid in the direction of arrows V–T, whereby the clogging mass as formed onto said surfaces by the exhausted filtering powder and by dirt, is wholly knocked-down, forming a mud which is drawn-off at intervals from the filter bottom through the duct 72. Thus, the centrifugal pump-like operation of filter A results, during the cleansing step, in a restoring of surfaces D, and obviously of the whole filter A, to their condition of best filtering efficiency.

In the embodiment form shown in FIG. 3, the filter A' comprises again a volute-shaped chamber B; however, it consists of an upper filtering unit $C_2$ and of a lower filtering unit $C_1$, aligned with each other and fitted on a single hollow shaft F, whereby there are two pluralities of filtering elements D1 and D2, driven by a single shaft, with a consequent proportional increase in the total filtering surface.

Obviously, a filter having a more or less great capacity (i.e. with only one or more than one filtering units) will be utilized, according to the different capacity of dry-cleaning plant; moreover, a single filter or more filters may be utilized in a dry-cleaning plant.

What I claim is:

1. A solvent filter comprising a casing having a vertical axis enclosing an elongated central cylindrical space and a peripheral scroll-like space, the cross-sectional shape of said casing in planes perpendicular to said axis being spiral, said casing having a given minimum radial distance from said axis and a stepped portion parallel to said axis between the largest and smallest portions of said spiral, a filter assembly supported for rotation about said axis within said central cylindrical space comprising a hollow shaft at said axis, drive means for said shaft outside said casing to be rotated for filter cleansing, a plurality of essentially planar elongated vane-like elements, having filtering surfaces, in planes radial to and evenly arranged mounted upon said shaft for rotation therewith, said elements being shorter than the axial dimension of said casing to form spaces within said casing at both ends of said elements, inlet duct means connected to said casing and outlet duct means for circulating the solvent through said filtering surfaces for solvent filtering, and drain duct means at the bottom of said casing for exhausting of the muddy liquid resulting from filter cleansing.

2. A filter as set forth in claim 1 wherein said stepped portion is channel shaped.

3. A filter as set forth in claim 1 wherein a plurality of filter assemblies are mounted in said casing, said assemblies being axially aligned with said shaft.

4. A filter as set forth in claim 1 wherein spaced plates are provided upon said shaft in which said filter assemblies are mounted.

References Cited

UNITED STATES PATENTS

| | | | |
|---|---|---|---|
| Re. 11,805 | 1/1900 | Watson et al. | 210—323 X |
| 1,566,929 | 12/1925 | Thune | 210—412 X |
| 2,022,016 | 11/1935 | Wardle | 210—332 |
| 2,243,585 | 5/1941 | Towler et al. | 210—416 X |
| 2,399,887 | 5/1946 | Olson | 210—416 X |
| 3,241,676 | 3/1966 | Neuville et al. | 210—82 X |

REUBEN FRIEDMAN, Primary Examiner

F. A. SPEAR, JR., Assistant Examiner

U.S. Cl. X.R.

210—332, 345, 409